United States Patent [19]

Hetzel et al.

[11] Patent Number: 4,482,750
[45] Date of Patent: Nov. 13, 1984

[54] PROCESS FOR REMOVING ALKALINE CATALYSTS FROM POLYETHER POLYOLS

[75] Inventors: Hartmut Hetzel, Cologne; Pramod Gupta, Bedburg; Roland Nast, Dormagen; Herbert Echterhof, Erkelenz; Ulrich Brocker, Cologne, all of Fed. Rep. of Germany

[73] Assignee: Bayer Aktiengesellschaft, Leverkusen, Fed. Rep. of Germany

[21] Appl. No.: 452,178

[22] Filed: Dec. 22, 1982

Related U.S. Application Data

[63] Continuation of Ser. No. 251,432, Apr. 6, 1981, abandoned.

[30] Foreign Application Priority Data

Apr. 25, 1980 [DE] Fed. Rep. of Germany ....... 3016113

[51] Int. Cl.³ ............................................ C07C 41/34
[52] U.S. Cl. .................................... 568/621; 568/620; 568/623; 568/624
[58] Field of Search ................ 568/621, 620, 623, 625

[56] References Cited

U.S. PATENT DOCUMENTS

| | | |
|---|---|---|
| 3,299,151 | 1/1967 | Wismer et al. . |
| 3,489,680 | 1/1970 | Snavely . |
| 3,582,491 | 6/1971 | Louvar et al. . |
| 3,823,145 | 7/1974 | Louvar et al. . |
| 4,240,908 | 12/1980 | Swain et al. . |
| 4,322,312 | 3/1982 | Boehmke ............................ 568/621 |

FOREIGN PATENT DOCUMENTS

1082810  9/1967  United Kingdom .

Primary Examiner—Howard T. Mars
Attorney, Agent, or Firm—Gene Harsh; Joseph C. Gil

[57] ABSTRACT

A process for removing alkali material from a polyether polyol. From 1-20 wt. % water and 0-30 wt. % inert organic solvent are added to an alkaline polyether polyol. The resultant emulsion is maintained at a temperature of at least 70° C. for a period of at least 30 minutes with little or no stirring to effect separation of the emulsion into an organic and an aqueous phase. The aqueous phase is then separated from the organic phase and the organic phase is treated by known methods to remove residual alkali material.

9 Claims, No Drawings

PROCESS FOR REMOVING ALKALINE CATALYSTS FROM POLYETHER POLYOLS

This application is a continuation of application Ser. No. 251,432, filed Apr. 6, 1981, now abandoned.

BACKGROUND OF THE INVENTION

This invention relates to a process for removing alkaline catalysts from polyether polyols produced by base-catalyzed alkoxylation reactions.

In practice, polyalkylene oxide polyethers are primarily used as starting components for the production of foamed or nonfoamed polyurethane plastics. To this end, the polyethers are reacted with polyisocyanates, optionally in stages and optionally in the presence of additives. In order to avoid any adverse effect upon the polyisocyanate polyaddition reaction and impairment of the properties of the resultant polyurethane plastics, the polyether polyols are generally required to be substantially free from chemical impurities.

On an industrial scale, polyether polyols are generally produced by the addition of alkylene oxides (particularly propylene oxide and/or ethylene oxide) to a compound containing active hydrogen atoms (for example, water, polyalcohols or polyamines) in the presence of a basic substance (generally alkali metal hydroxides) which acts as a catalyst. The conventional amount of catalyst is from about 0.1 to 1.0% by weight (from 1,000 to 10,000 ppm). On completion of the alkoxylation reaction, it is necessary, for the reasons explained above, to treat the polyether polyols in such a way that the concentration of basic substances in the end product is reduced to about 0.0005% (5 ppm) or lower (cf. U.S. Pat. No. 4,129,718).

In one of the known processes commonly used to reduce the concentration of basic substance in the polyether polyol, the basic catalyst (for example, KOH) is removed from the alkaline polymer in several steps. Initially, the polymer is neutralized (for example, by using dilute sulfuric acid). Most of the water which is present is then distilled off and the inorganic salts (for example, potassium sulfate) are crystallized. The precipitated salt is filtered off, the remaining water is then distilled off and the residual salt removed by filtration.

The disadvantages of the known neutralization processes are discussed in detail in the introduction of U.S. Pat. No. 3,833,669. The major problems encountered in such processes are difficulty in filtration due to the very finely divided particles of the salt and high consumption of energy and chemicals.

In another type of process for removing an alkaline catalyst from a polyether which has been used industrially, the catalyst is removed from the alkaline polymer by adsorption on a material such as synthetic magnesium silicate (see, U.S. Pat. No. 4,029,879). The disadvantages of this type of process (cf. U.S. Pat. Nos. 3,715,402 and 4,129,718) include the possibility that the product polyol may be damaged by oxidation and considerable expense due to high consumption of adsorbents and the relatively high cost of regenerating the adsorbent.

SUMMARY OF THE INVENTION

It is an object of the present invention to provide a simple and economic process for removing substantially all of the alkaline catalyst from polyether polyols in which most of the catalyst may be recovered.

It is also an object of the present invention to provide a process for removing and recovering substantially all of the alkaline catalyst from a polyether polyol which does not deleteriously affect the polyether polyol.

It is a further object of this invention to provide a process for removing and recovering substantially all of the alkaline catalyst from a polyether polyol which does not require expenditure of large amounts of energy.

These and other objects which will be apparent to those in the art are accomplished by the process of the present invention in which 1-20 wt.% water and 0-30 wt.% inert organic solvent are added to the alkaline polymer and the resultant emulsion is maintained at a temperature of at least 70° C. for at least 30 minutes (with little or no stirring) before removing the alkali catalyst. This removal of the alkali material is accomplished by first separating the aqueous phase of the treated emulsion from the organic phase and then removing residual alkali material by known methods such as adding an acid or adsorbent to the organic phase before distilling off any water or solvent remaining in that organic phase.

DETAILED DESCRIPTION OF THE INVENTION

The present invention relates to a process for removing the alkali catalyst from a polyether polyol produced by the base-catalyzed polyaddition of alkylene oxides. In this process, from 1 to 20% by weight (preferably from 2 to 10% by weight) of water and, optionally, from 0 to 30% by weight (preferably from 3 to 10% by weight), based on polymer, of an inert organic solvent are first added to the alkaline polymer. The resultant emulsion is then maintained at a temperature of at least 70° C. (preferably from 85° to 130° C.) for at least 30 minutes (preferably from 2 to 6 hours) with little or no stirring. The aqueous phase is subsequently separated off and residues of the alkali catalyst are removed from the organic phase by techniques known to those in the art. One suitable method for removing alkali residue is addition of an acid or an adsorbent and the distilling off of any remaining water and organic solvent. It is preferred that each step of the present invention be carried out under an inert gas atmosphere (particularly nitrogen).

The process of the present invention may be applied to any of the commonly available polyether polyols based on ethylene, propylene, butylene oxide and mixtures thereof which are not completely miscible with water (i.e., form an emulsion after the addition of from 2 to 10% of water to the crude polyether). Short-chained polyethers (molecular weight of about 300) which contain no ethylene oxide, polyethers of medium molecular weight (about 4,000) which contain less than about 20% of ethylene oxide and polyethers of relatively high molecular weight (about 20,000) which contain less than about 40% of ethylene oxide are generally suitable to the present invention.

In the first stage of the process according to the present invention, 1-20 wt.% water may be added with stirring to the alkaline polymer at a temperature above 70° C. The water may also be added to the alkaline polymer after an inert organic solvent (preferably toluene) has been added to that polymer to reduce its viscosity. A milky, stable emulsion will immediately be formed, which emulsion shows no sign of sedimentation or creaming. In fact, even when the emulsion is exposed to a centrifugal force of of 4000 G for over 15 minutes in a centrifuge, there is no sign of separation of the aqueous and organic phases.

The emulsion obtained in the first stage of the process should then be exposed to a temperature of at least 70° C. (preferably from 85° to 130° C.) for at least 30 minutes (preferably from 2 and 6 hours) with little or no stirring. This heat treatment reduces the stability of the emulsion to such an extent that it may subsequently be separated almost quantitatively into aqueous and organic phases. Although after phase separation the organic phase still contains about 2% by weight of water due to the hydrophilic nature of the polyether, virtually all the alkali material is surprisingly contained in the aqueous phase.

Separation of the aqueous and organic phases of the emulsion may be accomplished by methods known to those in the art. Suitable separation techniques include sedimentation which utilizes the effect of gravity, use of an electrical field, a hydrocyclone or a centrifuge (see, U.S. Pat. No. 3,715,402). However, it is particularly preferred to separate the phases by means of a coalescing apparatus such as that which is described in detail below. Such separation makes it possible to reduce the residual base content of the polyether to less than 100 ppm. The degree of separation accomplished by each of the described methods amounts to from 65 to 96% in separation by sedimentation, from 86 to 97% in separations by centrifugation and from 98 to 99% in separations by coalescense.

The coalescing apparatus preferably used in the present invention is a sheet-form structure made up of fibers which must be as fine as possible and resistant to alkali materials. The fibers are preferably less than 50 $\mu$m thick, more preferably from 1 to 10 $\mu$m thick. The fiber layer should preferably be from 1 to 100 mm thick, corresponding to a weight per unit area of from about 100 to 10 000 g/m$^2$. Good results may be obtained by using mats of either mineral fibers (for example, asbestos) or of slightly sintered alkali-resistant metal fleeces (for example, nickel fibers) which have a weight per unit area of 750 g/m$^2$ (a thickness of from about 5 to 10 mm). Fiber materials of alkali-resistant plastics (for example, the material sold under the trademark, Teflon, by DuPont de Nemours, E. I. and Company) may also be used. The flow rate of the emulsion through the fiber mat should preferably be from about 1 to 20 m/h. A polyether treated with such a coalescing apparatus will form a clear phase boundary with the separated aqueous alkaline phase. Separation of these phases is, therefore, easily accomplished.

The separated polyether polyol may be treated by techniques known to those in the art (e.g., by the addition of an acid or an adsorbent, filtration and distillation) to remove residual traces of alkali, water and solvent. It is also possible to repeat the process of the present invention (i.e., addition of water to form an emulsion which is maintained at a temperature in excess of 70° C. for at least 30 minutes and subsequent removal of the aqueous phase) on the separated polyol. The aqueous alkali metal hydroxide solution separated off may then be concentrated, purified and reused either as a catalyst for the alkoxylation reaction or for other purposes.

The process according to the present invention is particularly advantageous in that: (1) energy consumption is low (distillation is necessary to only a very limited extent); (2) little, if any, salt is accumulated; (3) filtration difficulties are avoided; and (4) consumption of chemicals is low because the catalyst may be recovered and relatively small amounts of acid and adsorbent are required.

The process according to the present invention is illustrated by the following Examples which should not be construed as limiting the scope of the invention. Unless otherwise indicated, quantities are expressed in parts by weight and percent by weight.

EXAMPLES

Example 1

6,130 g of alkaline polymer (trifunctional polyether based on trimethylol propane alkoxylated with ethylene oxide and propylene oxide; OH number 35) having a catalyst content of 3,600 ppm of potassium (corresponding to approximately 5,200 ppm of KOH) were introduced into a 10-liter, round-bottomed flask. After the addition of 527 g of toluene, the contents of the flask were heated to 100° C. under nitrogen. 245.2 g of water (4%, based on the polyether) were added to the solution and the liquid was intensively emulsified for five minutes at a stirrer speed of 500 r.p.m. Thereafter, the stirrer speed was reduced to 30 r.p.m. and the emulsion maintained at a temperature of 100° C. for three hours. During this period, the originally milky-white emulsion assumed a yellowish-opaque appearance.

The emulsion was thus destabilized and separated into an aqueous phase and an organic phase by sedimentation, centrifuging and coalescing at about 90° C.

1(a) Sedimentation 100 ml of the destabilized emulsion were taken from the round-bottomed flask and placed gently in a glass vessel. A clear liquid (potassium hydroxide) settled on the bottom of the glass vessel where it was clearly separated from the organic phase. Analysis of the opaque organic phase revealed a residual base content of 1,799 ppm of KOH.

1(b) Centrifugation 100 ml of the destabilized emulsion were introduced into a glass beaker and exposed to a centrifugal force of 4,000 G for 15 minutes in a centrifuge. Two phases with a clear boundary were formed. The residual base content of the organic phase was 732 ppm of KOH.

1(c) Coalescing

The rest of the destabilized emulsion was pumped through a glass tube in which a coalescing membrane had been installed by means of a gear metering pump. The coalescing membrane was a slightly sintered metal fleece mat having a thickness of about 8 mm for a weight per unit area of 750 g/m$^2$. The fibers of the metal fleece were 4 $\mu$m thick.

After passing through the coalescing membrane (diameter 80 mm; throughput 10 l/h corresponding to a flowthrough rate of 0.00055 m/s), the aqueous phase separated from the almost clear organic phase. The polyether had a residual base content of 83 ppm of KOH.

Example 2

5,280 g of alkaline polymer (trifunctional polyether based on glycerol alkoxylated with ethylene oxide and propylene oxide; OH number 56) having a catalyst content of 4,600 ppm of potassium (corresponding to 6,600 ppm of KOH) were introduced into a 10-liter, round-bottomed flask and heated to 100° C. under nitrogen. 264 g (5%) of water were added to the liquid with stirring at 500 r.p.m. for five minutes. The stirrer speed was then reduced to 50 r.p.m. and the emulsion formed was maintained at a temperature of 100° C. for three hours. During this period, the originally milky-white emulsion assumed a yellowish-opaque appearance.

The emulsion was thus destabilized. After sedimentation for two hours, a sample taken from the flask had a residual base content of 1,664 ppm of KOH. The rest of the emulsion was pumped through a coalescing membrane in the same way as in Example 1(c). After passing through the coalescing membrane, phase separation occurred. The organic phase had a residual base content of only 46 ppm of KOH.

Example 3

Example 1 was repeated using 6,600 g of alkaline polymer (trifunctional polyether based on trimethylol propane alkoxylated with ethylene oxide; OH number 35) having a catalyst content of 3,600 ppm of potassium (corresponding to about 5,200 ppm of KOH) but without the addition of toluene. The results of each type of separation technique were as follows:

3(a) Sedimentation (3 hours): 211 ppm residual KOH
3(b) Centrifugation: 173 ppm residual KOH
3(c) Coalescing: 88 ppm residual KOH

Example 4 (Comparison)

6,600 g of alkaline polymer of the type used in Example 1 were introduced into a 10-liter, round-bottomed flask and heated to 50° C. under nitrogen. 250 g of water were then added to this liquid with intensive stirring for five minutes at a stirrer speed of 500 r.p.m. The stirrer speed was then reduced to 50 r.p.m. and the temperature of the emulsion maintained at 50° C. Even after ten hours, the emulsion was still milky-white in color and remained stable. Phase separation could not be accomplished by sedimentation, by centrifugation or by coalescing.

Example 5

6,000 g of alkaline polymer (bifunctional polyether based on propylene glycol alkoxylated with propylene oxide; OH number 56) having a catalyst content of 3,200 ppm of potassium (corresponding to 4,600 ppm of KOH) were introduced into a ten-liter, round bottomed flask and heated to 100° C. under nitrogen. 300 g (5%) of water were added to the liquid with intensive stirring for five minutes at a stirrer speed of 500 r.p.m. The stirrer speed was then reduced to 50 r.p.m. and the emulsion formed was maintained at a temperature of 100° C. for five hours. During this period, the originally milky-white emulsion assumed a yellowish-opaque appearance. The thus destabilized emulsion was pumped through a coalescing membrane as in Example 1(c). After passing through the coalescing membrane, phase separation occurred. The organic phase had a residual base content of only 42 ppm of KOH.

What is claimed is:

1. A process for removing alkali material from a polyether polyol produced by base-catalyzed polyaddition of an alkylene oxide, comprising:
   (a) adding from 1 to 20 percent by weight of water and from 0 to 30 percent by weight of an inert, organic solvent to the alkaline polyether polyol to form an emulsion;
   (b) maintaining the thus-formed emulsion at a temperature of at least 70° C. for at least 30 minutes with little or no stirring to destabilize the emulsion and thereby promote separation of the emulsion into an organic and an aqueous phase;
   (c) separating the aqueous phase from the organic phase by passing the emulsion through a sheet-formed structure made of fine fibers, which sheet structure has a weight per unit area of from 100 to 10,000 g/m$^2$ and a thickness of from 1 to 100 mm; and
   (d) removing residual alkaline material from the organic phase.

2. The process of claim 1 wherein from 2 to 10% by weight of water are added to the alkaline polyether polyol in step (a).

3. The process of claim 1 wherein the inert organic solvent is toluene.

4. The process of claim 1 wherein the emulsion is maintained at a temperature of from 85° to 130° C. in step (b).

5. The process of claim 1 wherein the fibers of the sheet-form structure have a thickness of less than 50 μm.

6. The process of claim 7 wherein the fibers have a thickness of from 1 to 10 μm.

7. The process of claim 1 wherein the rate of flow of the emulsion through the fibrous sheet-form structure is from 1 to 20 m/h.

8. The process of claim 1 wherein the sheet-form structure is made of metal or mineral fibers.

9. The process of claim 1 wherein step (d) comprises: adding an acid or an adsorbent material to the organic phase, filtering the resultant mixture, and distilling off any remaining water and organic solvent from the filtrate.

* * * * *